US012606674B2

(12) United States Patent
Lee et al.

(10) Patent No.: US 12,606,674 B2
(45) Date of Patent: Apr. 21, 2026

(54) POLYAMIDE-BASED FILM, METHOD OF PREPARING THE SAME, AND COVER WINDOW AND DISPLAY DEVICE COMPRISING THE SAME

(71) Applicant: SK microworks Co., Ltd., Gyeonggi-do (KR)

(72) Inventors: Hak Soo Lee, Gyeonggi-do (KR); Hye Jin Kim, Gyeonggi-do (KR); Jin Woo Lee, Gyeonggi-do (KR)

(73) Assignee: MICROWORKS SOLUTIONS CO., LTD., Chungcheongnam-do (KR)

( * ) Notice: Subject to any disclaimer, the term of this patent is extended or adjusted under 35 U.S.C. 154(b) by 852 days.

(21) Appl. No.: 17/872,102

(22) Filed: Jul. 25, 2022

(65) Prior Publication Data

US 2023/0093730 A1 Mar. 23, 2023

(30) Foreign Application Priority Data

Aug. 31, 2021 (KR) ........................ 10-2021-0115972
May 4, 2022 (KR) ........................ 10-2022-0055281

(51) Int. Cl.
*C08G 73/14* (2006.01)
*B32B 7/12* (2006.01)
(Continued)

(52) U.S. Cl.
CPC ................ *C08G 73/14* (2013.01); *B32B 7/12* (2013.01); *B32B 27/34* (2013.01); *C08J 5/18* (2013.01);
(Continued)

(58) Field of Classification Search
CPC ........... C08G 73/14; B32B 7/12; B32B 27/34; B32B 2307/412; B32B 2307/536;
(Continued)

(56) References Cited

U.S. PATENT DOCUMENTS

| | | | | |
|---|---|---|---|---|
| 2020/0230705 | A1* | 7/2020 | Sasaki .................... | B23D 77/00 |
| 2020/0407507 | A1 | 12/2020 | Oh et al. | |
| 2021/0047485 | A1 | 2/2021 | Kim et al. | |
| 2021/0095082 | A1 | 4/2021 | Park et al. | |
| 2021/0095120 | A1 | 4/2021 | Jeon et al. | |

FOREIGN PATENT DOCUMENTS

| | | | |
|---|---|---|---|
| EP | 4036153 | A1 | 8/2022 |
| JP | 2000212303 | A * | 8/2000 |

(Continued)

OTHER PUBLICATIONS

Kuwata et al., JP 2000-212303 A machine translation in English, Aug. 2, 2000. (Year: 2000).*

(Continued)

*Primary Examiner* — David T Karst
(74) *Attorney, Agent, or Firm* — IP & T GROUP LLP

(57) ABSTRACT

The embodiments relate to a polyamide-based film that is excellent in optical properties and mechanical properties, to a process for preparing the same, and to a cover window and a display device comprising the same. It comprises a polyamide-based polymer and a filler in an amount of 600 ppm or more relative to the weight of the polyamide-based polymer, wherein when the 3D surface roughness thereof is measured, the number of summits per unit area (Sds) is 4,400/$mm^2$ or less.

12 Claims, 4 Drawing Sheets

(51) Int. Cl.

*B32B 27/34* (2006.01)
*C08J 5/18* (2006.01)
*C08K 3/36* (2006.01)

(52) U.S. Cl.

CPC .......... *C08K 3/36* (2013.01); *B32B 2307/412* (2013.01); *B32B 2307/536* (2013.01); *B32B 2307/538* (2013.01); *B32B 2307/732* (2013.01); *B32B 2377/00* (2013.01); *B32B 2457/202* (2013.01); *B32B 2457/206* (2013.01); *C08K 2201/003* (2013.01); *C08K 2201/011* (2013.01)

(58) Field of Classification Search

CPC ........ B32B 2307/538; B32B 2307/732; B32B 2377/00; B32B 2457/202; B32B 2457/206; C08J 5/18; C08K 3/36; C08K 2201/003; C08K 2201/011

USPC .......................................................... 528/324

See application file for complete search history.

(56) References Cited

FOREIGN PATENT DOCUMENTS

| | | | |
|---|---|---|---|
| JP | 2021055094 | A | 4/2021 |
| JP | 2021055096 | A | 4/2021 |
| KR | 10-2020-0082203 | A | 7/2020 |
| KR | 20210001876 | A | 1/2021 |

OTHER PUBLICATIONS

Office Action for the Korean Patent Application No. 10-2022-0055281 issued by the Korean Intellectual Property Office on Aug. 19, 2024.

Office Action on the Japanese Patent Application No. 2022-127990 issued by the Japanese Patent Office on Sep. 12, 2023.

Extended European Search Report for the European Patent Application No. 22192297.4 issued by the European Patent Office on Jan. 19, 2023.

* cited by examiner

POLYAMIDE-BASED FILM, METHOD OF PREPARING THE SAME, AND COVER WINDOW AND DISPLAY DEVICE COMPRISING THE SAME

CROSS-REFERENCE TO RELATED APPLICATION(S)

This application claims benefit of priority to Korean Patent Application No. 10-2021-0115972 filed on Aug. 31, 2021 and No. 10-2022-0055281 filed on May 4, 2022 in the Korean Intellectual Property Office, the disclosure of each of the foregoing applications is incorporated herein by reference in its entirety.

TECHNICAL FIELD

Embodiments relate to a polyamide-based film, to a process for preparing the same, and to a cover window and a display device comprising the same.

BACKGROUND ART

Polyamide-based polymers are excellent in resistance to friction, heat, and chemicals. Thus, they are employed in such applications as primary electrical insulation, coatings, adhesives, resins for extrusion, heat-resistant paintings, heat-resistant boards, heat-resistant adhesives, heat-resistant fibers, and heat-resistant films.

Polyamide is used in various fields. For example, polyamide is made in the form of a powder and used as a coating for a metal or a magnetic wire. It is mixed with other additives depending on the application thereof. In addition, polyamide is used together with a fluoropolymer as a painter for decoration and corrosion prevention. It also plays a role of bonding a fluoropolymer to a metal substrate. In addition, polyamide is used to coat kitchenware, used as a membrane for gas separation by virtue of its heat resistance and chemical resistance, and used in natural gas wells for filtration of such contaminants as carbon dioxide, hydrogen sulfide, and impurities.

In recent years, polyamide has been developed in the form of a film, which is less expensive and has excellent optical, mechanical, and thermal characteristics. Such a polyamide-based film may be applied to display materials for organic light-emitting diodes (OLEDs) or liquid crystal displays (LCDs), and the like, and to antireflection films, compensation films, and retardation films if retardation properties are implemented.

When such a polyamide-based film is applied to a foldable display, a flexible display, and the like, optical properties such as transparency and colorlessness and mechanical properties such as flexibility and hardness are required. In general, however, since optical properties and mechanical properties are in a trade-off relationship, an improvement in the mechanical properties would impair the optical properties.

Accordingly, research on polyamide-based films with improved mechanical properties and optical properties is continuously required.

DETAILED DESCRIPTION OF THE INVENTION

Technical Problem

The embodiments provide a polyamide-based film that is excellent in optical properties and mechanical properties and a cover window and a display device comprising the same.

The embodiments provide a process for preparing a polyamide-based film that is excellent in optical properties and mechanical properties.

Solution to the Problem

The polyamide-based film according to an embodiment comprises a polyamide-based polymer and a filler in an amount of 600 ppm or more relative to the weight of the polyamide-based polymer, wherein when the 3D surface roughness thereof is measured, the number of summits per unit area (Sds) measured by the following measurement method is 4,400/mm$^2$ or less.

[Measurement Method]

CONTOUR GT-X of Bruker is used, the measurement area at one time is set to 166 μm×220 μm, a 20-magnification objective lens is adopted for measurement, and a Gaussian filter is applied after the measurement.

The process for preparing a polyamide-based film according to an embodiment comprises polymerizing a diamine compound, a dicarbonyl compound, and, optionally, a dianhydride compound in an organic solvent to prepare a polymer solution comprising a polyamide-based polymer; casting the solution onto a belt and drying it to prepare a gel sheet; and thermally treating the gel sheet.

The cover window for a display device according to an embodiment comprises a polyamide-based film and a functional layer, wherein when the 3D surface roughness of the polyamide-based film is measured, the number of summits per unit area (Sds) measured by the above measurement method is 4,400/mm$^2$ or less.

The display device according to an embodiment comprises a display unit; and a cover window disposed on the display unit, wherein the cover window comprises a polyamide-based film and a functional layer, and when the 3D surface roughness of the polyamide-based film is measured, the number of summits per unit area (Sds) measured by the above measurement method is 4,400/mm$^2$ or less.

Advantageous Effects of the Invention

The polyamide-based film according to an embodiment comprises a filler in an amount of 600 ppm or more relative to the weight of a polyamide-based polymer, wherein when the 3D surface roughness thereof is measured, the number of summits per unit area (Sds) is adjusted to 4,400/mm$^2$ or less. Thus, optical properties such as yellow index and transmittance may be improved, mechanical properties such as modulus and surface hardness may be enhanced, and slip properties and windability may be enhanced.

BEST MODE FOR CARRYING OUT THE INVENTION

Figure 1:
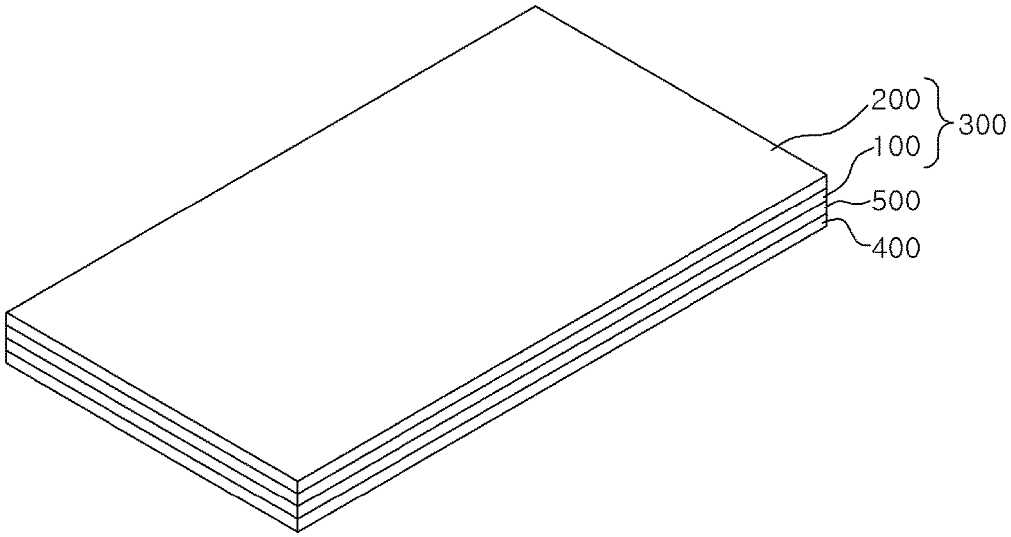
FIGS. 1 to 3 are each schematic perspective, exploded, and cross-sectional views of a display device according to an embodiment.

Hereinafter, the embodiments will be described in detail with reference to the accompanying drawings so that those skilled in the art to which the present invention pertains may easily practice them. However, the embodiments may be implemented in many different ways and are not limited to those described herein.

Throughout the present specification, in the case where each film, window, panel, layer, or the like is mentioned to be formed "on" or "under" another film, window, panel, layer, or the like, it means not only that one element is directly formed on or under another element, but also that one element is indirectly formed on or under another element with other element(s) interposed between them. In addition, the term on or under with respect to each element may be referenced to the drawings. For the sake of description, the sizes of individual elements in the appended drawings may be exaggeratedly depicted and do not indicate the actual sizes. In addition, the same reference numerals refer to the same elements throughout the specification.

Throughout the present specification, when a part is referred to as "comprising" an element, it is understood that other elements may be comprised, rather than other elements are excluded, unless specifically stated otherwise.

In the present specification, a singular expression is interpreted to cover a singular or plural number that is interpreted in context unless otherwise specified.

In addition, all numbers and expressions related to the quantities of components, reaction conditions, and the like used herein are to be understood as being modified by the term "about," unless otherwise indicated.

The terms first, second, and the like are used herein to describe various elements, and the elements should not be limited by the terms. The terms are used only for the purpose of distinguishing one element from another.

In addition, the term "substituted" as used herein means to be substituted with at least one substituent group selected from the group consisting of deuterium, —F, —Cl, —Br, —I, a hydroxyl group, a cyano group, a nitro group, an amino group, an amidino group, a hydrazine group, a hydrazone group, an ester group, a ketone group, a carboxyl group, a substituted or unsubstituted alkyl group, a substituted or unsubstituted alkenyl group, a substituted or unsubstituted alkynyl group, a substituted or unsubstituted alkoxy group, a substituted or unsubstituted alicyclic organic group, a substituted or unsubstituted heterocyclic group, a substituted or unsubstituted aryl group, and a substituted or unsubstituted heteroaryl group. The substituent groups enumerated above may be connected to each other to form a ring.

Polyamide-Based Film

The embodiments provide a polyamide-based film that is excellent in optical properties such as transmittance, haze, and yellow index, mechanical properties such as modulus and surface hardness, as well as slip properties and windability.

The polyamide-based film according to an embodiment comprises a polyamide-based polymer and a filler in an amount of 600 ppm or more relative to the weight of the polyamide-based polymer.

When the 3D surface roughness of the polyamide-based film is measured, the number of summits per unit area (Sds) measured by the following measurement method is 4,400/$mm^2$ or less.

[Measurement Method]

CONTOUR GT-X of Bruker is used, the measurement area at one time is set to 166 μm×220 μm, a 20-magnification objective lens is adopted for measurement, and a Gaussian filter is applied after the measurement.

The 3D surface roughness is data obtained by measuring the irregularities of the surface of an object in an optical or contact manner. It may represent the topographical characteristics of a predetermined area relative to the planar direction of the object's surface. The summit refers to, for example, a peak appearing at a point higher than the mean plane by 5% or more of the surface elevation difference (Sz) when a 3D surface roughness is measured. In addition, the summit refers to a peak spaced apart from other peaks at a specific distance (1% of the sample side size). The peak may refer to all points located above the nearest eight points. More specifically, the number of summits per unit area (Sds) may be a value measured according to the standard provided in EUR 15178 EN.

For example, if the Sds exceeds 4,400/$mm^2$, an excessively large number of fine irregularities having a large height variation are present on the surface of the film, which may deteriorate the slip property and windability of the film.

According to embodiments, if the Sds is adjusted to 4,400/$mm^2$ or less, optical properties such as transmittance, haze, and yellow index and mechanical properties such as modulus and surface hardness of the film are comprehensively improved. Further, when the film is wound in the form of a roll, the wound film can be readily unwound without causing defects such as a lump.

In some embodiments, the Sds may be 4,000/$mm^2$ or less, 3,900/$mm^2$ or less, 3,800/$mm^2$ or less, 3,500/$mm^2$ or less, 3,300/$mm^2$ or less, or 3,100/$mm^2$ or less, but it is not limited thereto. In addition, the Sds may be 500/$mm^2$ or more, 800/$mm^2$ or more, 1,000/$mm^2$ or more, 1,200/$mm^2$ or more, 1500/$mm^2$ or more, 1,600/$mm^2$ or more, 1,800/$mm^2$ or more, 2,000/$mm^2$ or more, 2,200/$mm^2$ or more, or 2,400/$mm^2$ or more, but it is not limited thereto.

For example, the Sds may be 1,600 to 4,400/$mm^2$, 1,600 to 4,000/$mm^2$, 1,600 to 3,900/$mm^2$, 1,600 to 3,500/$mm^2$, 1,600 to 3,100/$mm^2$, 2,000 to 4,400/$mm^2$, 2,000 to 4,000/$mm^2$, 2,000 to 3,900/$mm^2$, 2,000 to 3,500/$mm^2$, 2,000 to 3,100/$mm^2$, 2,400 to 4,400/$mm^2$, 2,400 to 4,000/$mm^2$, 2,400 to 3,900/$mm^2$, 2,400 to 3,500/$mm^2$, or 2,400 to 3,100/$mm^2$.

In some embodiments, the Sz may be 320 nm or more. In such a case, as the degree of irregularities (the difference in height between the lowest point and the highest point) of the surface of the film increases, the microcontact area between adjacent parts in the thickness direction of the roll of the film may be reduced when the film is wound. As a result, windability and slip properties may be enhanced. Preferably, the Sz may be 330 nm or more, but it is not limited thereto. In addition, the Sz may be 2,000 nm or less, 1,800 nm or less, 1,500 nm or less, 1,200 nm or less, 1,000 nm or less, 800 nm or less, 700 nm or less, 600 nm or less, or 550 nm or less. More specifically, the Sz (surface elevation difference) may be 320 nm to 2,000 nm.

Sz (surface elevation difference) may refer to an average difference value between the five highest peaks and five lowest valleys. The peak may refer to all points located above the nearest eight points. The valley may refer to all points located below the nearest eight points. Specifically, Sz may be a ten-point height of surface (S10*z*) value defined according to ISO 25178. More specifically, Sz may be a value obtained by using CONTOUR GT-X of Bruker, setting the measurement area at one time to 166 μm×220 μm, adopting a 20-magnification objective lens for measurement, and applying a Gaussian filter after the measurement.

In some embodiments, the summits may have an average curvature (Ssc) of 24 to 47/mm, preferably, 24 to 45/mm, 24 to 42/mm, 25 to 47/mm, 25 to 45/mm, or 25 to 42/mm. In such a case, a film having excellent modulus, transmittance, haze, yellow index, surface hardness, slip property, and windability may be achieved.

The polyamide-based film according to an embodiment may have an x-direction refractive index ($n_x$) of 1.60 to 1.70, 1.61 to 1.69, 1.62 to 1.68, 1.64 to 1.68, 1.64 to 1.66, or 1.64 to 1.65.

In addition, the polyamide-based film may have a y-direction refractive index ($n_y$) of 1.60 to 1.70, 1.61 to 1.69, 1.62 to 1.68, 1.63 to 1.68, 1.63 to 1.66, or 1.63 to 1.64.

Further, the polyamide-based film may have a z-direction refractive index ($n_t$) of 1.50 to 1.60, 1.51 to 1.59, 1.52 to 1.58, 1.53 to 1.58, 1.54 to 1.58, or 1.54 to 1.56.

If the x-direction refractive index, the y-direction refractive index, and the z-direction refractive index of the polyamide-based film are within the above ranges, when the film is applied to a display device, its visibility is excellent not only from the front but also from a lateral side, so that a wide angle of view can be achieved.

The polyamide-based film according to an embodiment may have an in-plane retardation ($R_o$) of 800 nm or less. Specifically, the in-plane retardation ($R_o$) of the polyamide-based film may be 700 nm or less, 600 nm or less, 550 nm or less, 100 nm to 800 nm, 200 nm to 800 nm, 200 nm to 700 nm, 300 nm to 700 nm, 300 nm to 600 nm, or 300 nm to 540 nm.

In addition, the polyamide-based film according to an embodiment may have a thickness direction retardation ($R_{th}$) of 5,000 nm or less. Specifically, the thickness direction retardation ($R_{th}$) of the polyamide-based film may be 4,800 nm or less, 4,700 nm or less, 4,650 nm or less, 1,000 nm to 5,000 nm, 1,500 nm to 5,000 nm, 2,000 nm to 5,000 nm, 2,500 nm to 5,000 nm, 3,000 nm to 5,000 nm, 3,500 nm to 5,000 nm, 4,000 nm to 5,000 nm, 3,000 nm to 4,800 nm, 3,000 nm to 4,700 nm, 4,000 nm to 4,700 nm, or 4,200 nm to 4,650 nm.

Here, the in-plane retardation ($R_o$) is a parameter defined by a product ($\Delta n_{xy} \times d$) of anisotropy ($\Delta n_{xy} = |n_x - n_y|$) of refractive indices of two mutually perpendicular axes on a film and the film thickness (d), which is a measure of the degree of optical isotropy and anisotropy.

In addition, the thickness direction retardation ($R_{th}$) is a parameter defined by a product of an average of the two birefringences $\Delta n_{xz}$ ($=|n_x - n_z|$) and $\Delta n_{yz}$ ($=|n_y - n_z|$) observed on a cross-section in the film thickness direction and the film thickness (d).

If the in-plane retardation and the thickness direction retardation of the polyamide-based film are within the above ranges, when the film is applied to a display device, it is possible to minimize the optical distortion and color distortion and to minimize the light leakage from a lateral side as well.

The filler may adjust such mechanical properties as hardness, modulus, brittleness, and flexibility and such optical properties as transmittance, haze, and yellow index of the film. It may also adjust the topographical characteristics of the film surface.

In some embodiments, particles having a hardness of 2.5 to 6 may be used as the filler without limitation. If the filler has a hardness within the above range, it is possible to enhance the hardness and modulus of the film, while its flexibility may not be reduced. In addition, the optical properties of the film may not be impaired. Preferably, the hardness of the filler may be 2.5 to 5 or 2.5 to 4.

Preferably, the filler may comprise inorganic particles comprising at least one of silica and barium sulfate ($BaSO_4$).

The filler may have an average particle diameter (D50) of 30 nm to 200 nm. Specifically, the average particle diameter of the filler may be 30 nm to 180 nm, 30 nm to 150 nm, 30 nm to 120 nm, 30 nm to 100 nm, 40 nm to 200 nm, 40 nm to 180 nm, 40 nm to 150 nm, 40 nm to 120 nm, 40 nm to 100 nm, 50 nm to 200 nm, 50 nm to 180 nm, 50 nm to 150 nm, 50 nm to 120 nm, 50 nm to 100 nm, 60 nm to 200 nm, 60 nm to 180 nm, 60 nm to 150 nm, 60 nm to 120 nm, or 60 nm to 100 nm, but it is not limited thereto. If the filler has a particle diameter within the above range, even when a large amount of the filler is used to achieve excellent mechanical properties, the windability and slip properties of the film may be enhanced without deteriorating the flexibility and optical properties of the film.

In some embodiments, while the filler has an average particle diameter within the above range, about 90% or more of the particles may have a particle diameter of 30 nm to 200 nm, 30 nm to 150 nm, 30 nm to 120 nm, 50 nm to 200 nm, 50 nm to 150 nm, or 50 nm to 120 nm.

The content of the filler may be 600 ppm or more based on the total weight of the polyamide-based polymer. Specifically, the content of the filler may be 700 ppm or more, 800 ppm or more, 900 ppm or more, 1,000 ppm or more, 1,100 ppm or more, or 1,200 ppm or more, based on the total weight of the polyamide-based polymer. In addition, it may be 5,000 ppm or less, 4,500 ppm or less, 4,000 ppm or less, 3,500 ppm or less, 3,000 ppm or less, 2,500 ppm or less, or 2,000 ppm or less, based on the total weight of the polyamide-based polymer, but it is not limited thereto. More specifically, the content of the filler may be 600 to 3,000 ppm based on the total weight of the polyamide-based polymer, but it is not limited thereto.

If the content of the filler is outside the above range, the haze of the film is steeply increased, and the filler may aggregate with each other on the surface of the film, so that a feeling of foreign matter may be visually observed, or it may cause a trouble in the sliding performance or deteriorate the windability in the preparation process. In addition, such mechanical properties as hardness and flexibility and such optical properties as transmittance and yellow index of the film may be overall impaired.

For example, the surface characteristics such as Sds, Sz, and Ssc expressed as the 3D surface roughness can be adjusted to desired ranges by controlling the particle size and content of the filler.

The filler may have a refractive index of 1.55 to 1.75. Specifically, the refractive index of the filler may be 1.60 to 1.75, 1.60 to 1.70, 1.60 to 1.68, or 1.62 to 1.65, but it is not limited thereto.

If the refractive index of the filler satisfies the above range, the birefringence values related to $n_x$, $n_y$, and $n_z$ can be appropriately adjusted, and the luminance of the film at various angles can be improved.

On the other hand, if the refractive index of the filler is outside the above range, there may arise a problem in that the filler is visually noticeable on the film or that the haze is increased due to the filler.

The surface of the filler is not subjected to special coating treatment, and it may be uniformly dispersed in the entire film.

As the polyamide-based film comprises the filler, the film can secure a wide angle of view without a deterioration in the optical properties.

The content of residual solvents in the polyamide-based film may be 1,500 ppm or less. For example, the content of residual solvents may be 1,200 ppm or less, 1,000 ppm or less, 800 ppm or less, or 500 ppm or less, but it is not limited thereto.

The residual solvent refers to a solvent that has not been volatilized during the film production and remains in the film finally produced.

If the content of the residual solvents in the polyamide-based film exceeds the above range, the durability of the film may be deteriorated, and it may have an impact on the luminance.

When the polyamide-based film according to an embodiment based on a thickness of 50 μm is folded to have a radius of curvature of 3 mm, the number of folding before the fracture may be 200,000 or more.

The number of folding counts one when the film is folded to have a radius of curvature of 3 mm and then unfolded.

As the number of folding of the polyamide-based film satisfies the above range, it can be advantageously applied to a foldable display device or a flexible display device.

The polyamide-based film according to an embodiment may have a surface roughness of 0.01 μm to 0.07 μm. Specifically, the surface roughness may be 0.01 μm to 0.07 μm or 0.01 μm to 0.06 μm, but it is not limited thereto.

As the surface roughness of the polyamide-based film satisfies the above range, it may be advantageous for achieving high luminance even when the angle from the normal direction of a surface light source is increased.

The polyamide-based film according to an embodiment comprises a polyamide-base polymer. The polyamide-based polymer may comprise an amide-based repeat unit. In some embodiments, the polyamide-based polymer may comprise a polyamide-imide polymer that further comprises an imide-based repeat unit.

As another example, the polyamide-based polymer may comprise an amide-based repeat unit and an imide-based repeat unit.

The polyamide-based polymer may be prepared by simultaneously or sequentially reacting reactants that comprise a diamine compound and a dicarbonyl compound. Specifically, the polyamide-based polymer may be prepared by polymerizing a diamine compound and a dicarbonyl compound.

In some embodiments, the polyamide-based polymer may be formed as it further comprises a dianhydride compound. In such an event, a polyimide-imide polymer that contains an imide repeat unit derived from the polymerization of a diamine compound and a dianhydride compound and an amide repeat unit derived from the polymerization of a diamine compound and a dicarbonyl compound may be formed.

The diamine compound is a compound that forms an imide bond with the dianhydride compound and forms an amide bond with the dicarbonyl compound, to thereby form a copolymer.

The diamine compound is not particularly limited, but it may be, for example, an aromatic diamine compound that contains an aromatic structure. For example, the diamine compound may be a compound represented by the following Formula 1.

$H_2N\text{-}(E)_e\text{-}NH_2$ [Formula 1]

In Formula 1, E may be selected from a substituted or unsubstituted divalent $C_6$-$C_{30}$ aliphatic cyclic group, a substituted or unsubstituted divalent $C_4$-$C_{30}$ heteroaliphatic cyclic group, a substituted or unsubstituted divalent $C_6$-$C_{30}$ aromatic cyclic group, a substituted or unsubstituted divalent $C_4$-$C_{30}$ heteroaromatic cyclic group, a substituted or unsubstituted $C_1$-$C_{30}$ alkylene group, a substituted or unsubstituted $C_2$-$C_{30}$ alkenylene group, a substituted or unsubstituted $C_2$-$C_{30}$ alkynylene group, —O—, —S—, —C(=O)—, —CH(OH)—, —S(=O)$_2$—, —Si$(CH_3)_2$—, —C$(CH_3)_2$—, and —C$(CF_3)_2$—.

e is selected from integers of 1 to 5. When e is 2 or more, the Es may be the same as, or different from, each other.

$(E)_e$ in Formula 1 may be selected from the groups represented by the following Formulae 1-1a to 1-14a, but it is not limited thereto.

1-1a

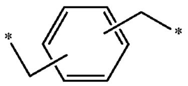

1-2a

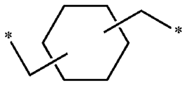

1-3a

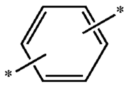

1-4a

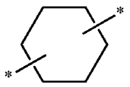

1-5a

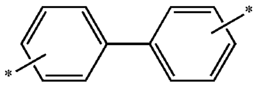

1-6a

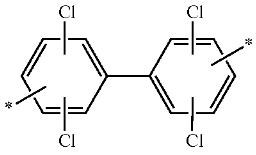

1-7a

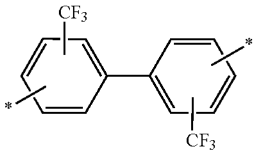

1-8a

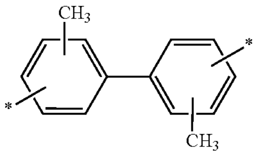

1-9a

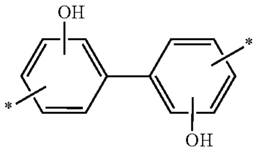

1-10a

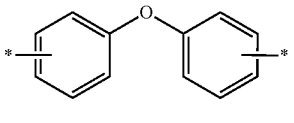

1-11a

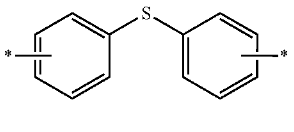

-continued 1-12a

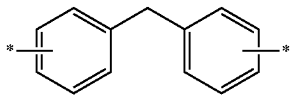

1-13a

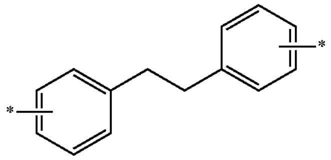

1-14a $*-(CH_2)_n-*$ (n is slected from integers of 1 to 12)

Specifically, $(E)_e$ in Formula 1 may be selected from the groups represented by the following Formulae 1-1b to 1-13b, but it is not limited thereto.

1-1b

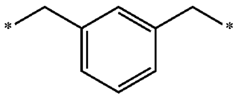

1-2b

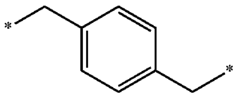

1-3b

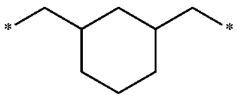

1-4b

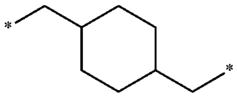

1-5b

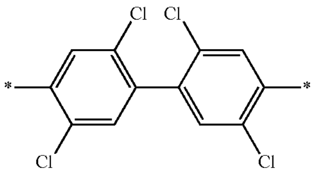

1-6b

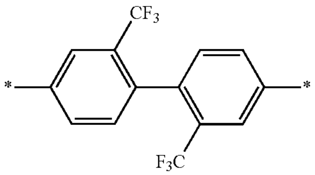

1-7b

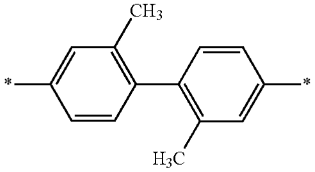

-continued 1-8b

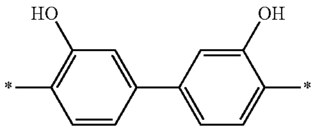

1-9b

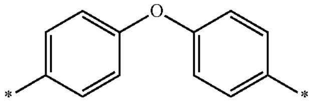

1-10b

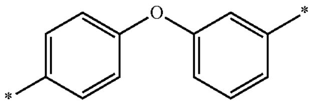

1-11b

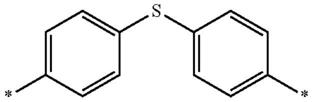

1-12b

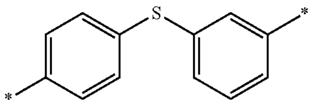

1-13b

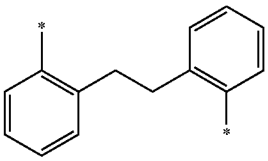

More specifically, (E)e in Formula 1 may be the group represented by the above Formula 1-6b or the group represented by the above Formula 1-9b.

In an embodiment, the diamine compound may comprise a compound having a fluorine-containing substituent or a compound having an ether group (—O—).

The diamine compound may be composed of a compound having a fluorine-containing substituent. In such an event, the fluorine-containing substituent may be a fluorinated hydrocarbon group and specifically may be a trifluoromethyl group. But it is not limited thereto.

In another embodiment, one kind of diamine compound may be used as the diamine compound. That is, the diamine compound may be composed of a single component.

For example, the diamine compound may comprise 2,2'-bis(trifluoromethyl)-4,4'-diaminobiphenyl (TFDB) represented by the following formula, but it is not limited thereto.

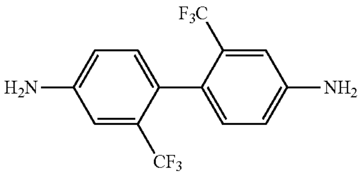

TFDB

The dianhydride compound is not particularly limited, but it may comprise an aromatic dianhydride compound. For example, the dianhydride compound may reduce the birefringence characteristics of the polyamide-based resin and enhance such optical properties as transmittance of the polyamide-based film.

In an embodiment, the dianhydride compound may comprise a compound having a fluorine-containing substituent. In such an event, the fluorine-containing substituent may be a fluorinated hydrocarbon group. Specifically, it may comprise a perfluorinated alkyl group such as a trifluoromethyl group ($—C_nF_{4n+1}$, wherein n is a positive integer), but it is not limited thereto.

In some embodiments, the dianhydride compound may comprise two or more aromatic ring groups substituted with a dianhydride group. The aromatic ring groups may be connected to each other by a fluorine-containing substituent. The fluorine-containing substituent may comprise a hydrocarbon group substituted with a fluorinated alkyl group. For example, the fluorinated alkyl group may comprise a perfluorinated alkyl group such as a trifluoromethyl group ($—C_nF_{4-1}$, wherein n is a positive integer). The hydrocarbon group may comprise a saturated hydrocarbon group, for example, an alkylene group such as a methylene group ($—CH_2—$).

For example, the aromatic dianhydride compound may comprise a compound represented by the following Formula 2.

[Formula 2]

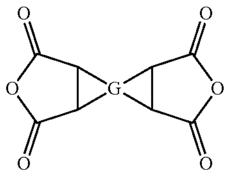

In Formula 2, G is a substituted or unsubstituted tetravalent $C_6$-$C_{30}$ aliphatic cyclic group, a substituted or unsubstituted tetravalent $C_4$-$C_{30}$ heteroaliphatic cyclic group, a substituted or unsubstituted tetravalent $C_6$-$C_{30}$ aromatic cyclic group, or a substituted or unsubstituted tetravalent $C_4$-$C_{30}$ heteroaromatic cyclic group, wherein the aliphatic cyclic group, the heteroaliphatic cyclic group, the aromatic cyclic group, or the heteroaromatic cyclic group may be present alone, fused to each other to form a condensed ring, or bonded by a bonding group selected from a substituted or unsubstituted $C_1$-$C_{30}$ alkylene group, a substituted or unsubstituted $C_2$-$C_{30}$ alkenylene group, a substituted or unsubstituted $C_2$-$C_{30}$ alkynylene group, —O—, —S—, —C(=O)—, —CH(OH)—, $—S(=O)_2—$, $—Si(CH_3)_2—$, $—C(CH_3)_2—$, and $—C(CF_3)_2—$.

G in the above Formula 2 may be selected from the groups represented by the following Formulae 2-1a to 2-9a, but it is not limited thereto.

2-1a

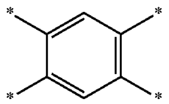

2-2a

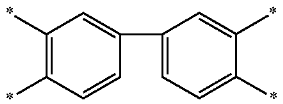

2-3a

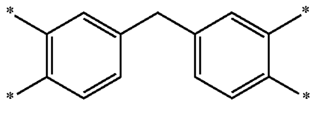

-continued 2-4a

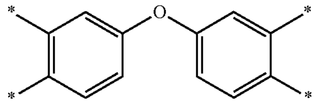

2-5a

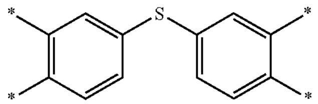

2-6a

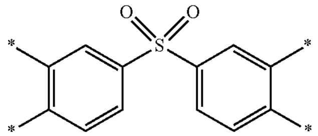

2-7a

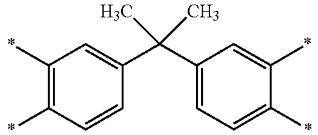

2-8a

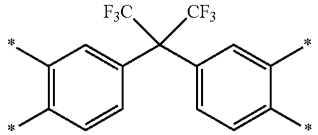

2-9a

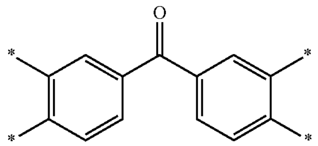

For example, G in Formula 2 may be the group represented by the above Formula 2-2a, the group represented by the above Formula 2-8a, or the group represented by the above Formula 2-9a.

For example, the dianhydride compound may comprise 2,2'-bis-(3,4-dicarboxyphenyl)hexafluoropropane dianhydride (6-FDA), 3,3',4,4'-biphenyltetracarboxylic dianhydride (BPDA), which have the following structures, or a combination thereof, but it is not limited thereto.

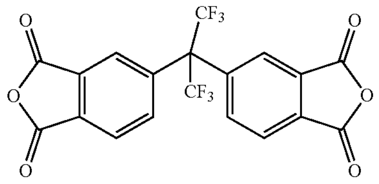

6-FDA

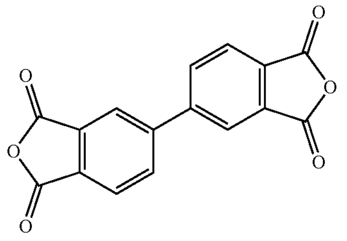

BPDA

The diamine compound and the dianhydride compound may be polymerized to form an amic acid group.

Subsequently, the amic acid group may be converted to an imide group through a dehydration reaction. In such a case, a polyamide-imide-based polymer comprising a polyimide segment and a polyamide segment may be formed.

The polyimide segment may form a repeat unit represented by the following Formula A.

[Formula A]

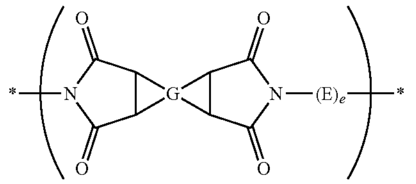

In Formula A, E, G, and e are as described above.

For example, the polyimide segment may comprise a repeat unit represented by the following Formula A-1, but it is not limited thereto.

[Formula A-1]

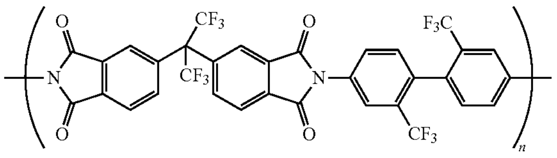

In Formula A-1, n may be an integer of 1 to 400.

The dicarbonyl compound is not particularly limited, but it may be, for example, a compound represented by the following Formula 3.

[Formula 3]

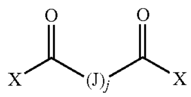

In Formula 3, J may be selected from a substituted or unsubstituted divalent $C_6$-$C_{30}$ aliphatic cyclic group, a substituted or unsubstituted divalent $C_4$-$C_{30}$ heteroaliphatic cyclic group, a substituted or unsubstituted divalent $C_6$-$C_{30}$ aromatic cyclic group, a substituted or unsubstituted divalent $C_4$-$C_{30}$ heteroaromatic cyclic group, a substituted or unsubstituted alkylene group, a substituted or unsubstituted $C_2$-$C_{30}$ alkenylene group, a substituted or unsubstituted $C_2$-$C_{30}$ alkynylene group, —O—, —S—, —C(=O)—, —CH(OH)—, —S(=O)$_2$—, —Si(CH$_3$)$_2$—, —C(CH$_3$)$_2$—, and —C(CF$_3$)$_2$—.

j is selected from integers of 1 to 5. When j is 2 or more, the Js may be the same as, or different from, each other.

X is a halogen atom. Specifically, X may be F, Cl, Br, I, or the like. More specifically, X may be $C_1$, but it is not limited thereto.

$(J)_j$ in the above Formula 3 may be selected from the groups represented by the following Formulae 3-1a to 3-14a, but it is not limited thereto.

3-1a

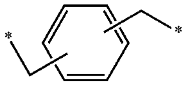

3-2a

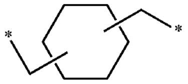

3-3a

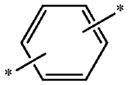

3-4a

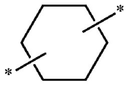

3-5a

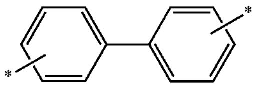

3-6a

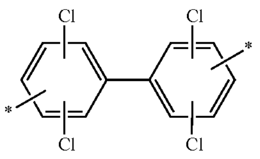

3-7a

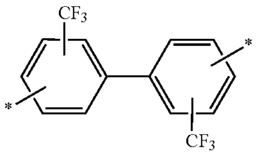

3-8a

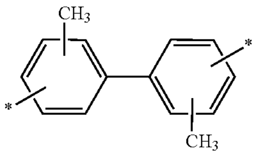

3-9a

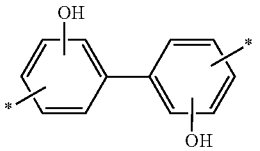

3-10a

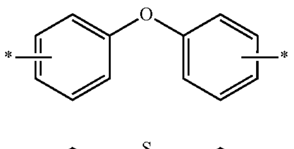

3-11a

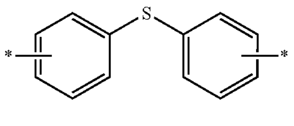

3-12a

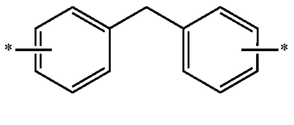

-continued 3-13a

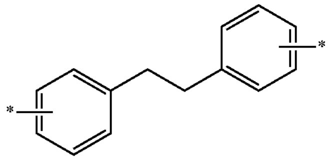

3-14a $*-(CH_2)_n-*$ (n is slected from integers of 1 to 12)

Specifically, $(J)_j$ in the above Formula 3 may be selected from the groups represented by the following Formulae 3-1b to 3-8b, but it is not limited thereto.

3-1b

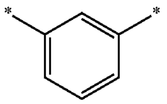

3-2b

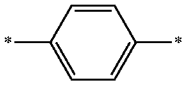

3-3b

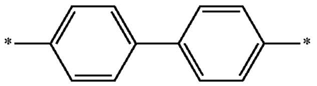

3-4b

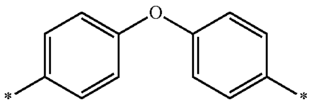

3-5b

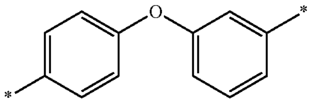

3-6b

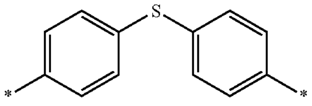

3-7b

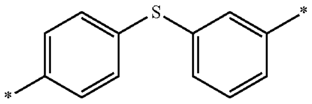

3-8b

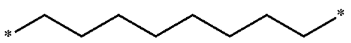

More specifically, $(J)_j$ in Formula 3 may be the group represented by the above Formula 3-1b, the group represented by the above Formula 3-2b, the group represented by the above Formula 3-3b, or the group represented by the above Formula 3-8b.

In an embodiment, one or more kinds of dicarbonyl compound may be used as the dicarbonyl compound. If two or more dicarbonyl compounds are used, at least two dicarbonyl compounds in which $(J)_j$ in the above Formula 3 is selected from the groups represented by the above Formulae 3-1b to 3-8b may be used as the dicarbonyl compound.

In another embodiment, the dicarbonyl compound may be an aromatic dicarbonyl compound that contains an aromatic structure.

The dicarbonyl compound may comprise terephthaloyl chloride (TPC), 1,1'-biphenyl-4,4'-dicarbonyl dichloride (BPDC), isophthaloyl chloride (IPC), as represented by the following formulae, or a combination thereof. But it is not limited thereto.

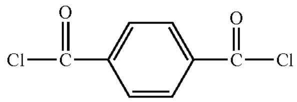

TPC

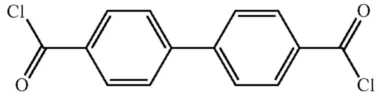

BPDC

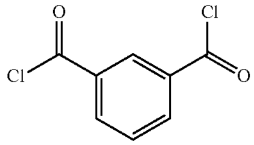

IPC

In an embodiment, the polyamide-based polymer may comprise one or more types of an amide-based repeat unit.

In addition, when the polyamide-based polymer comprises two or more amide-based repeat units, the two or more amide-based repeat units may comprise a first amide-based repeat unit and a second amide-based repeat unit. The first amide-based repeat unit may be formed by reacting a first dicarbonyl compound with the diamine compound. The second amide-based repeat unit may be formed by reacting a second dicarbonyl compound with the diamine compound.

As another example, the polyamide-based polymer may comprise a first amide-based repeat unit derived from a first dicarbonyl compound and a second amide-based repeat unit derived from a second dicarbonyl compound, The first dicarbonyl compound and the second dicarbonyl compound may be compounds different from each other.

The first dicarbonyl compound and the second dicarbonyl compound may comprise two carbonyl groups, respectively. The angle between the two carbonyl groups contained in the first dicarbonyl compound may be greater than the angle between the two carbonyl groups contained in the second dicarbonyl compound.

In some embodiments, the first dicarbonyl compound and the second dicarbonyl compound may be structural isomers to each other.

The first dicarbonyl compound and the second dicarbonyl compound may be an aromatic dicarbonyl compound, respectively. In some embodiments, the first dicarbonyl compound and the second dicarbonyl compound may each have one benzene ring (a phenyl group).

For example, the first dicarbonyl compound and the second dicarbonyl compound may be aromatic dicarbonyl compounds different from each other, but they are not limited thereto.

If the first dicarbonyl compound and the second dicarbonyl compound are an aromatic dicarbonyl compound, respectively, they comprise a benzene ring. Thus, they can contribute to improvements in the mechanical properties such as surface hardness and tensile strength of a film that comprises the polyamide-based polymer thus produced.

For example, the angle between the two carbonyl groups contained in the first dicarbonyl compound may be 160 to 180°, and the angle between the two carbonyl groups contained in the second dicarbonyl compound may be 80 to 140°.

For example, the first dicarbonyl compound may comprise TPC, and the second dicarbonyl compound may comprise IPC, but they are not limited thereto.

If TPC is used as the first dicarbonyl compound and IPC is used as the second dicarbonyl compound in a proper combination, a film that comprises the polyamide-based resin thus produced may have high oxidation resistance, productivity, light transmittance, transparency, and modulus, and low haze and yellow index, along with improved surface roughness characteristics.

The diamine compound and the dicarbonyl compound may be polymerized to form a repeat unit represented by the following Formula B.

[Formula B]

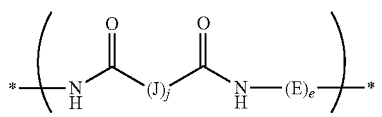

In Formula B, E, J, e, and j are as described above.

For example, the diamine compound and the dicarbonyl compound may be polymerized to form amide repeat units represented by the following Formulae B-1 and B-2.

[Formula B-1]

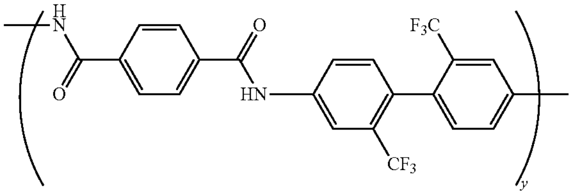

In Formula B-1, y is an integer of 1 to 400.

[Formula B-2]

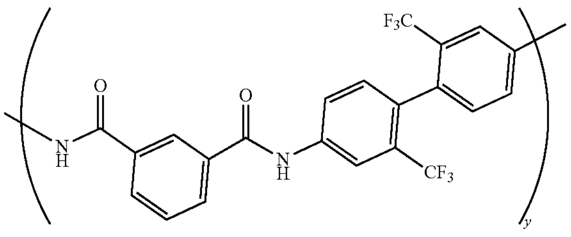

In Formula B-2, y is an integer of 1 to 400.

In some embodiments, the molar ratio of the first amide-based repeat unit to the second amide-based repeat unit may be 20:80 to 80:20. Preferably, the molar ratio of the first amide-based repeat unit to the second amide-based repeat unit may be 30:70 to 80:20, 40:60 to 80:20, or 50:50 to 80:20, but it is not limited thereto.

In some embodiments, the polyamide-based polymer may comprise an imide-based repeat unit and an amide-based repeat unit at a molar ratio of 0:100 to 80:20. Specifically, the polyamide-based polymer may comprise an imide-based repeat unit and an amide-based repeat unit at a molar ratio of 0:100 to 70:30, 0:100 to 50:50, 1:99 to 50:50, or 5:95 to 50:50.

If the above molar ratio range is satisfied, the flexibility, mechanical strength, and optical properties of the polyamide-based film may be enhanced together.

For example, the composition of the polyamide-based polymer and the particle size and content of the filler, process conditions, and the like as described above may be integrated to control the characteristics measured as the 3D roughness of the film surface.

In some embodiments, the polyamide-based film may have a thickness deviation of 4 μm or less based on a thickness of 50 μm. The thickness deviation may refer to a deviation between the maximum or minimum value with respect to the average of thicknesses measured at 10 random points of the film. In such a case, as the polyamide-based film has a uniform thickness, its optical properties and mechanical properties at each point may be uniformly exhibited.

The polyamide-based film may have a transmittance of 80% or more. For example, the transmittance may be 82% or more, 85% or more, 88% or more, 89% or more, 80% to 99%, 88% to 99%, or 89% to 99%, but it is not limited thereto.

The polyamide-based film may have a yellow index of 4 or less. For example, the yellow index may be 3.5 or less, or 3 or less, but it is not limited thereto. The polyamide-based film may have a modulus of 5 GPa or more. Specifically, the modulus may be 5.5 GPa or more, 6.0 GPa or more, or 6.5 GPa or more, but it is not limited thereto.

The polyamide-based film may have a compressive strength of 0.4 kgf/μm or more. Specifically, the compressive strength may be 0.45 kgf/μm or more, or 0.46 kgf/μm or more, but it is not limited thereto.

When the polyamide-based film is perforated at a speed of 10 mm/minute using a 2.5-mm spherical tip in a UTM compression mode, the maximum diameter (mm) of perforation including a crack is 60 mm or less. Specifically, the maximum diameter of perforation may be 5 mm to 60 mm, 10 mm to 60 mm, 15 mm to 60 mm, 20 mm to 60 mm, 25 mm to 60 mm, or 25 mm to 58 mm, but it is not limited thereto.

The polyamide-based film may have a haze of 1% or less. Specifically, the haze may be 0.7% or less, or 0.5% or less, but it is not limited thereto.

The polyamide-based film may have a pencil hardness of HB or higher. Specifically, the pencil hardness may be F or higher, or H or higher, but it is not limited thereto.

The polyamide-based film may have a tensile strength of 15 $kgf/mm^2$ or more. Specifically, the tensile strength may be 18 $kgf/mm^2$ or more, 20 $kgf/mm^2$ or more, 21 $kgf/mm^2$ or more, or 22 $kgf/mm^2$ or more, but it is not limited thereto.

The polyamide-based film may have an elongation of 15% or more. Specifically, the elongation may be 16% or more, 17% or more, or 17.5% or more, but it is not limited thereto.

The physical properties of the polyamide-based film as described above are based on a thickness of 40 μm to 60 μm. For example, the physical properties of the polyamide-based film are based on a thickness of 50 μm.

The features on the components and properties of the polyamide-based film as described above may be combined with each other.

For example, the polyamide-based film comprises a polyamide-based polymer and may have a modulus of 5 GPa or more, a transmittance of 80% or more, a haze of 1% or less, a yellow index of 3 or less, and a pencil hardness of F or higher, based on a film thickness of 50 μm.

Cover Window for a Display Device

The cover window for a display device according to an embodiment comprises a polyamide-based film and a functional layer.

When the 3D surface roughness of the polyamide-based film is measured, the number of summits per unit area (Sds) measured by the following measurement method is 4,400/$mm^2$ or less.

[Measurement Method]

CONTOUR GT-X of Bruker is used, the measurement area at one time is set to 166 μm×220 μm, a 20-magnification objective lens is adopted for measurement, and a Gaussian filter is applied after the measurement.

Details on the polyamide-based film are as described above.

The cover window for a display device can be advantageously applied to a display device.

As the polyamide-based film has the 3D surface roughness characteristics as described above, it may have excellent optical/mechanical properties and slip properties/windability.

Display Device

The display device according to an embodiment comprises a display unit; and a cover window disposed on the display unit, wherein the cover window comprises a polyamide-based film and a functional layer.

When the 3D surface roughness of the polyamide-based film is measured, the number of summits per unit area (Sds) measured by the following measurement method is 4,400/$mm^2$ or less.

[Measurement Method]

CONTOUR GT-X of Bruker is used, the measurement area at one time is set to 166 μm×220 μm, a 20-magnification objective lens is adopted for measurement, and a Gaussian filter is applied after the measurement.

Details on the polyamide-based film and the cover window are as described above.

Figure 2:
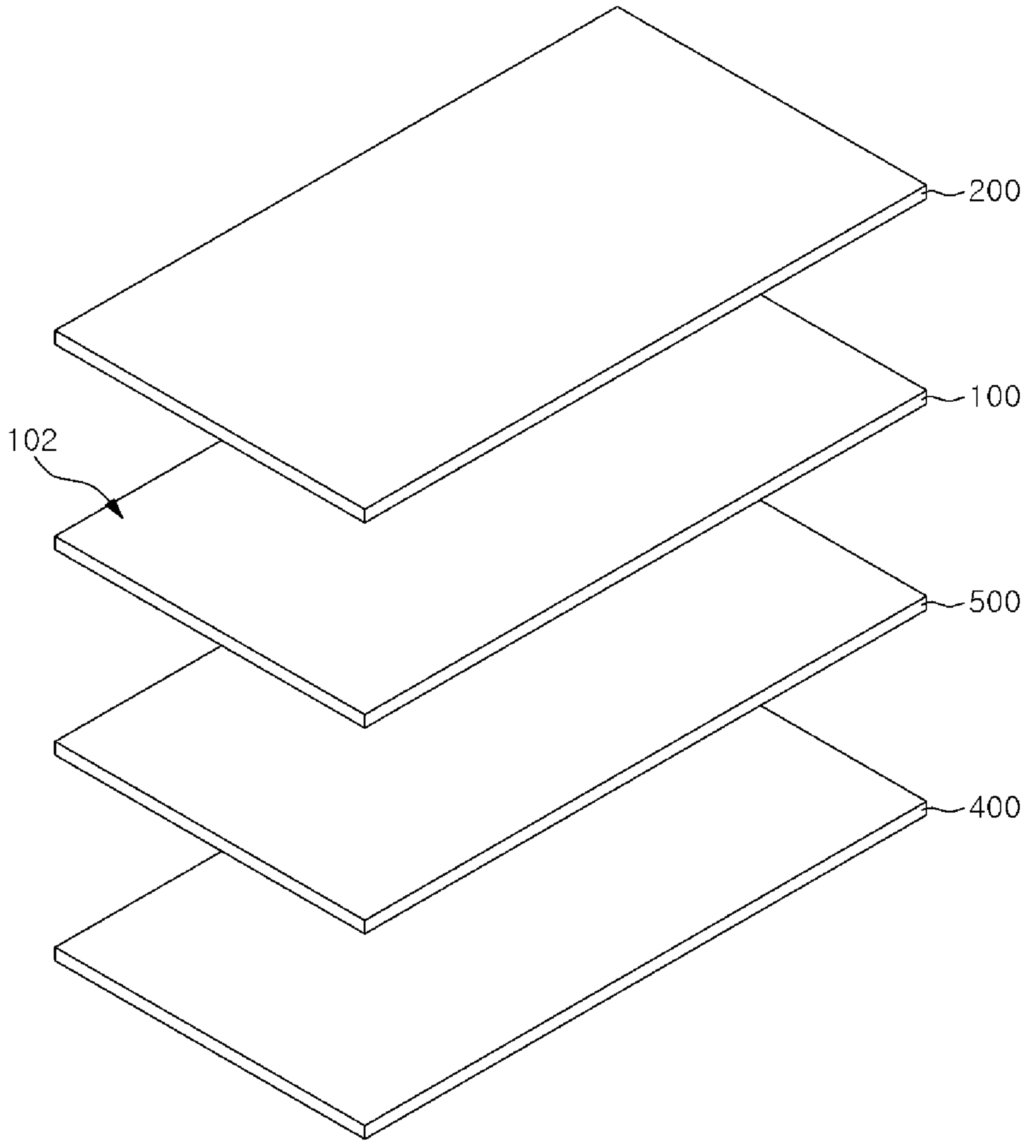
Figure 3:
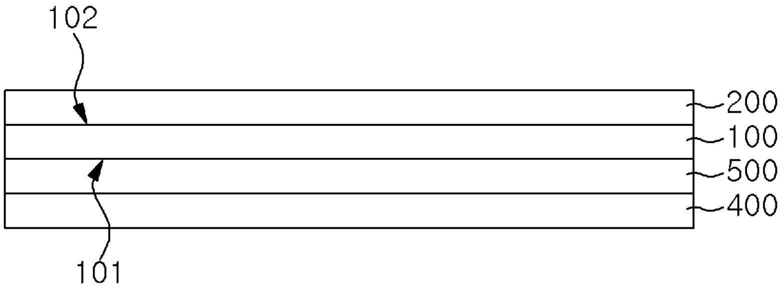

FIGS. 1 to 3 are each schematic exploded, perspective, and cross-sectional views of a display device according to an embodiment.

Specifically, FIGS. 1 to 3 illustrate a display device, which comprises a display unit (400) and a cover window (300) disposed on the display unit (400), wherein the cover window comprises a polyamide-based film (100) having a first side (101) and a second side (102) and a functional layer (200), and an adhesive layer (500) is interposed between the display unit (400) and the cover window (300).

The display unit (400) is for displaying an image, and it may have flexible characteristics.

The display unit (400) may be a display panel for displaying an image. For example, it may be a liquid crystal display panel or an organic electroluminescent display panel. The organic electroluminescent display panel may comprise a front polarizing plate and an organic EL panel.

The front polarizing plate may be disposed on the front side of the organic EL panel. Specifically, the front polarizing plate may be attached to the side on which an image is displayed in the organic EL panel.

The organic EL panel may display an image by self-emission of a pixel unit. The organic EL panel may comprise an organic EL substrate and a driving substrate. The organic EL substrate may comprise a plurality of organic electroluminescent units, each of which corresponds to a pixel. Specifically, it may comprise a cathode, an electron transport layer, a light-emitting layer, a hole transport layer, and an anode. The driving substrate is operatively coupled to the organic EL substrate. That is, the driving substrate may be coupled to the organic EL substrate so as to apply a driving signal such as a driving current, so that the driving substrate can drive the organic EL substrate by applying a current to the respective organic electroluminescent units.

In addition, an adhesive layer (500) may be interposed between the display unit (400) and the cover window (300). The adhesive layer may be an optically transparent adhesive layer, but it is not particularly limited.

The cover window (300) may be disposed on the display unit (400). The cover window is located at the outermost position of the display device according to an embodiment to thereby protect the display unit.

The cover window (300) may comprise a polyamide-based film and a functional layer. The functional layer may be at least one selected from the group consisting of a hard coating, a reflectance reducing layer, an antifouling layer, and an antiglare layer. The functional layer may be coated on at least one side of the polyamide-based film.

The polyamide-based film according to an embodiment can be applied in the form of a film to the outside of a display device without changing the display driving method, the color filter inside the panel, or the laminated structure, thereby providing a display device having a uniform thickness, low haze, high transmittance, and high transparency. Since neither significant process changes nor cost increases are needed, it is advantageous in that the production costs can be reduced.

The polyamide-based film according to an embodiment is excellent in optical properties in terms of high transmittance, low haze, and low yellow index, as well as Sds, Sz, and/or Ssc on 3D surface roughness are adjusted to certain ranges. Thus, it may have excellent mechanical properties such as modulus and pencil hardness and handling conveniences such as slip properties and windability.

In addition, the polyamide-based film according to an embodiment can minimize the optical distortion since it has at most a certain level of in-plane retardation and a thickness direction retardation and can also reduce the light leakage from a lateral side.

The polyamide-based film having Sds, Sz, and/or Ssc in the above ranges has excellent optical/mechanical properties of the film and excellent slip properties and windability. Thus, even if the film has a large area, the film can be wound into a roll without damage and then unwound for use, and it can be advantageously applied to a rollable/flexible display device.

Process for Preparing a Polyamide-Based Film

An embodiment provides a process for preparing a polyamide-based film.

The characteristics on 3D surface roughness of the polyamide-based film may be the results materialized by combinations of the chemical and physical properties of the components, which constitute the polyamide-based film, along with the conditions in each step of the process for preparing the polyamide-based film as described below.

For example, the composition and content of the components that constitute the polyamide-based film, the polymerization conditions and thermal treatment conditions in the film preparation process, and the like are all combined to achieve the desired characteristics on 3D surface roughness.

The process for preparing a polyamide-based film according to an embodiment comprises polymerizing a diamine compound and at least one of a dicarbonyl compound and a dianhydride compound in an organic solvent to prepare a polymer solution comprising a polyamide-based polymer; casting the polymer solution onto a belt and drying it to prepare a gel sheet; and thermally treating the gel sheet.

Specifically, the process for preparing a polyamide-based film comprises polymerizing a diamine compound, a dicarbonyl compound, and, optionally, a dianhydride compound in an organic solvent to prepare a polymer solution comprising a polyamide-based polymer; casting the polymer solution onto a belt and drying it to prepare a gel sheet; and thermally treating the gel sheet.

Figure 4:
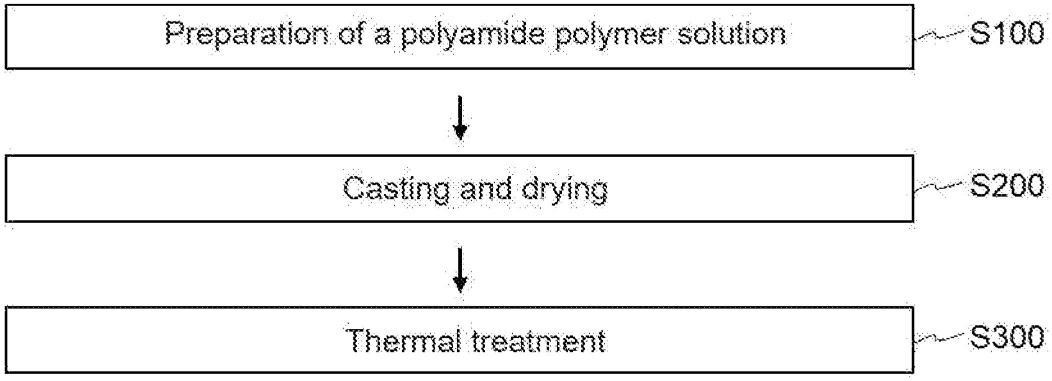
FIG. 4 is a schematic flow diagram of a process for preparing a polyamide-based film according to an embodiment.

Referring to FIG. 4, the process for preparing a polyamide-based film according to an embodiment comprises polymerizing a diamine compound, a dicarbonyl compound, and, optionally, a dianhydride compound in an organic solvent to prepare a polyamide-based polymer solution (S100); casting the polymer solution onto a belt and then drying it to prepare a gel sheet (S200); and thermally treating the gel sheet (S300).

The polyamide-based film is a film comprising a polyamide-based polymer, and the polyamide-based polymer may comprise an amide repeat unit and, optionally, may further comprise an imide repeat unit, as a structural unit.

In the process for preparing a polyamide-based film, the polymer solution for preparing a polyamide-based polymer may be prepared by simultaneously or sequentially mixing a diamine compound, a dicarbonyl compound, and, optionally, a dianhydride compound in an organic solvent in a reactor, and reacting the mixture (S100).

In an embodiment, the polymer solution may be prepared by simultaneously or sequentially mixing and reacting a diamine compound and a dicarbonyl compound in an organic solvent. Here, a dianhydride compound may be further mixed and reacted.

In an embodiment, the polymer solution may be prepared by simultaneously mixing and reacting a diamine compound, a dianhydride compound, and a dicarbonyl compound in an organic solvent.

In an embodiment, a diamine compound and a dianhydride compound may be reacted first in an organic solvent, which may be then reacted with a dicarbonyl compound. For example, a dianhydride compound is reacted with a diamine compound to form a polyamic acid or a polyimide. Then, the polyamic acid or polyimide may be reacted with a dicarbonyl compound to form a polymer solution comprising a polyamide-imide.

Alternatively, once a diamine compound has been reacted with a dicarbonyl compound, a dianhydride compound may be added. In such a case, the dianhydride compound may be added to a polyamide formed by the reaction of the diamine compound and the dicarbonyl compound.

In some embodiments, the dianhydride compound and the dicarbonyl compound may be employed at a molar ratio of 0:100 to 80:20. Specifically, the dianhydride compound and the dicarbonyl compound may be employed at a molar ratio of 0:100 to 70:30, 0:100 to 50:50, 1:99 to 50:50, or 5:95 to 50:50.

In another embodiment, two different kinds of dicarbonyl compounds may be used as the dicarbonyl compound. In such a case, the two kinds of dicarbonyl compounds may be mixed and reacted simultaneously or sequentially. Preferably, the first dicarbonyl compound may be reacted with the diamine compound, polyamic acid, or polyimide to form a polyamide-based prepolymer, and the polyamide-based prepolymer may be reacted with the second dicarbonyl compound to form the polyamide-based polymer. In such a case, the 3D surface roughness characteristics of the polyamide-based polymer may be readily adjusted.

The polymer contained in the polymer solution comprises an amide repeat unit derived from the polymerization of the diamine compound and the dicarbonyl compound and may comprise an imide repeat unit derived from the polymerization of the diamine compound and the dianhydride compound.

In an embodiment, the mixing and reaction of the diamine compound and the dianhydride compound may be carried out at a temperature of 0° C. to 50° C. If it is outside the above temperature range, excessively few or many polymerization nuclei are formed, thereby making it difficult to form a polyamide-based polymer having the desired 3D surface roughness characteristics. As a result, the mechanical properties and optical properties of the polyamide-based film may be deteriorated. In addition, the viscosity of the polymer solution may be less than a predetermined range. Preferably, the mixing and reaction of the diamine compound and the dianhydride compound may be carried out at a temperature of 0° C. to 45° C., 0° C. to 40° C., 10° C. to 50° C., 10° C. to 45° C., 10° C. to 40° C., 20° C. to 50° C., 20° C. to 45° C., or 20° C. to 40° C.

In an embodiment, the mixing and reaction of the diamine compound, polyamic acid, or polyimide with the dicarbonyl compound may be carried out at a temperature of −20° C. to 25° C. For example, the mixing and reaction of the solvent, the diamine compound, and the dicarbonyl compound may be carried out at a temperature of −20° C. to 25° C. If the temperature is outside the above temperature range, excessively few or many polymerization nuclei are formed, thereby making it difficult to form a polyamide-based polymer having desired properties. As a result, the 3D surface roughness characteristics as described above may not be achieved. Thus, such properties as modulus, yellow index, windability, and slip properties of the polyamide-based film may be deteriorated. In addition, the viscosity of the polymer solution may be less than a predetermined range, thereby increasing the thickness deviation of a film formed therefrom. Preferably, the step of preparing the solution comprising a polyamide-based polymer may be carried out at a temperature of −20° C. to 20° C., −20° C. to 15° C., −20° C. to 10° C., −15° C. to 20° C., −15° C. to 15° C., −15° C. to 10° C., −10° C. to 20° C., −10° C. to 15° C., −10° C. to 10° C., −8° C. to 20° C., −8° C. to 15° C., −8° C. to 10° C., −5° C. to 20° C., −5° C. to 15° C., or −5° C. to 10° C.

The content of solids contained in the polymer solution may be 10 to 30% by weight, but it is not limited thereto.

If the content of solids contained in the polymer solution is within the above range, a polyamide-based film can be effectively produced in the casting step. In addition, the polyamide-based film thus produced may have mechanical properties in terms of enhanced modulus, pencil hardness, and the like and optical properties in terms of a low yellow index and the like.

In still another embodiment, the step of preparing the polymer solution may further comprise adjusting the pH of the polymer solution. In this step, the pH of the polymer solution may be adjusted to 4 to 7, for example, 4.5 to 7.

The pH of the polymer solution may be adjusted by adding a pH adjusting agent. The pH adjusting agent is not particularly limited and may include, for example, amine-based compounds such as alkoxyamine, alkylamine, and alkanolamine.

As the pH of the polymer solution is adjusted to the above range, it is possible to prevent the occurrence of defects in the film produced from the polymer solution and to achieve the desired optical properties and mechanical properties in terms of yellow index and modulus.

The pH adjusting agent may be employed in an amount of 0.1% by mole to 10% by mole based on the total number of moles of monomers in the polymer solution.

The molar ratio of the first dicarbonyl compound to the second dicarbonyl compound used to prepare the polymer solution may be 25:75 to 95:5. Preferably, the molar ratio of the first dicarbonyl compound to the second dicarbonyl compound may be 20:80 to 80:20, 30:70 to 80:20, 40:60 to 80:20, or 50:50 to 80:20, but it is not limited thereto.

As the first dicarbonyl compound and the second dicarbonyl compound are used at such a ratio, it is possible to prepare a polyamide-based polymer having excellent compatibility with a filler and 3D surface roughness characteristics within the above ranges and to improve the mechanical properties and optical properties of the polyamide-based film.

Details on the diamine compound and the dicarbonyl compound are as described above.

In an embodiment, the organic solvent may be at least one selected from the group consisting of dimethylformamide (DMF), dimethylacetamide (DMAc), N-methyl pyrrolidone (NMP), m-cresol, tetrahydrofuran (THF), and chloroform. The organic solvent employed in the polymer solution may be dimethylacetamide (DMAc), but it is not limited thereto.

Figure 5:
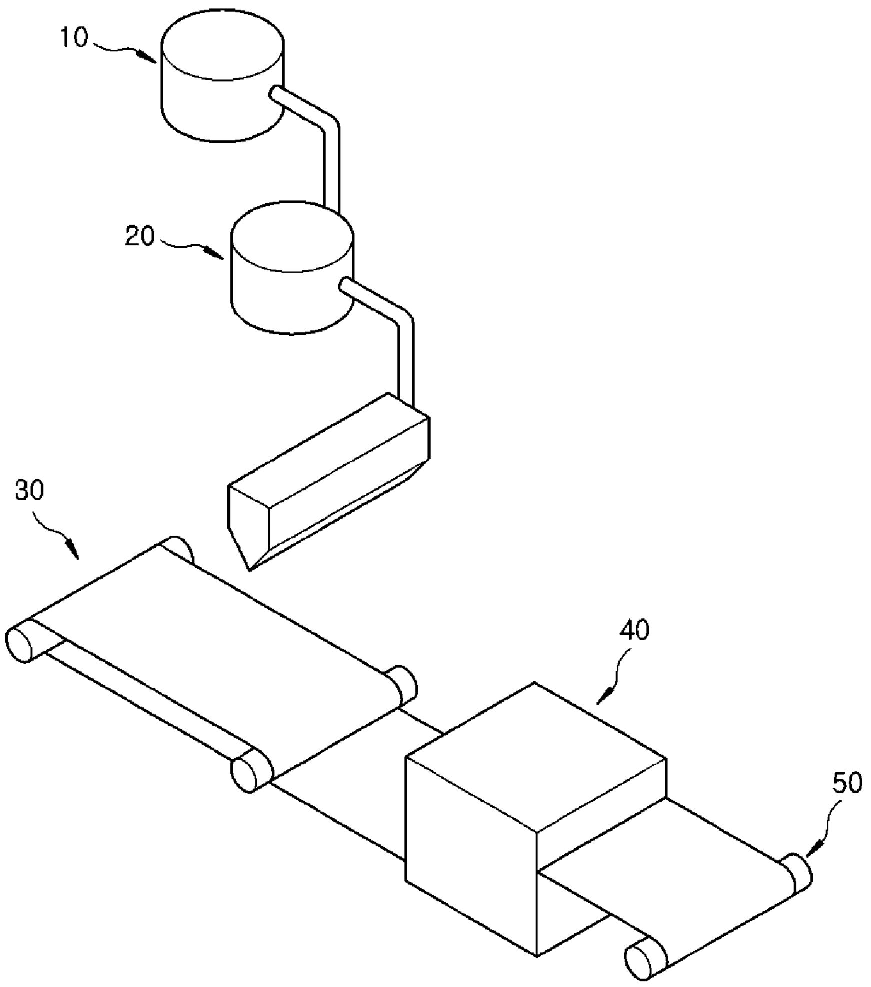
FIG. 5 is a schematic drawing that illustrates process facilities for preparing a polyamide-based film according to an embodiment.

FIG. 5 is a schematic drawing that illustrates process facilities for preparing a polyamide-based film according to an embodiment. Referring to FIG. 5, the polymer solution as described above may be prepared in a polymerization apparatus (10) and transferred to, and stored in, a tank (20).

The polymer solution may be stored at −20° C. to 20° C., −20° C. to 10° C., −20° C. to 5° C., −20° C. to 0° C., or 0° C. to 10° C.

If it is stored at the above temperature, it is possible to prevent degradation of the polymer solution and to lower the moisture content to thereby prevent defects of a film produced therefrom.

In an embodiment, the process may further comprise degassing the polyamide-based polymer solution. The degassing may be carried out in the tank (20). The step of degassing may remove moisture in the polymer solution, reduce impurities therein, and increase the reaction yield. In addition, the degassed polymer solution may be dried under a predetermined condition to effectively achieve the desired 3D surface roughness characteristics.

The degassing may comprise vacuum degassing or purging with an inert gas.

The vacuum degassing may be carried out for 30 minutes to 3 hours after depressurizing the internal pressure of the tank in which the polymer solution is contained to 0.1 to 0.7 bar. The vacuum degassing under these conditions may reduce bubbles in the polymer solution. As a result, it is possible to prevent surface defects of the film produced therefrom and to achieve excellent optical properties such as haze.

Specifically, the purging may be carried out by purging the tank with an inert gas at an internal pressure of 1 atm to 2 atm. The purging under these conditions may remove moisture in the polymer solution, reduce impurities to thereby increase the reaction yield, and achieve excellent optical properties such as haze and mechanical properties.

The inert gas may be at least one selected from the group consisting of nitrogen, helium (He), neon (Ne), argon (Ar), krypton (Kr), xenon (Xe), and radon (Rn), but it is not limited thereto. Specifically, the inert gas may be nitrogen.

The vacuum degassing and the purging with an inert gas may be carried out in separate steps.

For example, the step of vacuum degassing may be carried out, followed by the step of purging with an inert gas, but it is not limited thereto.

The vacuum degassing and/or the purging with an inert gas may improve the physical properties of the surface of a polyamide-based film thus produced.

In some embodiments, the polymer solution may be aged.

The aging may be carried out by leaving the polymer solution at a temperature of −10° C. to 10° C. for 24 hours or longer. In such an event, the polyamide-based polymer or unreacted materials contained in the polymer solution, for example, may complete the reaction or achieve chemical equilibrium, whereby the polymer solution may be homogenized. The mechanical properties and optical properties of a polyamide-based film formed therefrom may be substantially uniform over the entire area and entire depth of the film. Preferably, the aging may be carried out at a temperature of −5° C. to 10° C., −5° C. to 5° C., or −3° C. to 5° C.

Once the polyamide-based polymer solution in an organic solvent has been prepared as described above, a filler may be added to the polymer solution. For example, the addition of a filler may be carried out before the aging, before the defoaming, before the purging, or before the storage (charging to a tank).

The amount of the filler used may be 600 ppm or more based on the total weight of the solids content of the polymer solution. Specifically, the amount of the filler used may be 700 ppm or more, 800 ppm or more, 900 ppm or more, 1,000 ppm or more, 1,100 ppm or more, or 1,200 ppm or more, based on the total weight of the solids content. In addition, it may be 5,000 ppm or less, 4,500 ppm or less, 4,000 ppm or less, 3,500 ppm or less, 3,000 ppm or less, 2,500 ppm or less, or 2,000 ppm or less, based on the total weight of the solids content, but it is not limited thereto.

The filler may be dispersed in a dispersion solvent and added as a filler dispersion. A solvent exemplified above as a solvent for the polymer formation reaction may be used as a dispersion solvent of the filler dispersion. Preferably, the dispersion solvent and the polymer reaction solvent may be the same.

In some embodiments, the content of filler solids contained in the filer dispersion may be 10 to 30% by weight. In such an event, the filler may be mixed homogeneously in the polymer solution. Accordingly, it is possible to effectively control the 3D surface roughness characteristics of the film.

Details on the filler are as described above.

The viscosity of the polymer solution may be 50,000 cps to 500,000 cps at 20° C.

Specifically, the step of preparing the polymer solution may further comprise adjusting the viscosity of the polymer solution.

More specifically, the step of preparing a polymer solution comprising the polyamide-based polymer may comprise producing a first polymer solution having a viscosity of 500 cps to 10,000 cps when measured at 20° C.; and further reacting the first polymer solution with an additional dicarbonyl compound to produce a second polymer solution having a viscosity of 150,000 cps to 300,000 cps when measured at 20° C.

For example, the viscosity of the first polymer solution may be 600 to 10,000 cps, 800 to 10,000 cps, or 1,000 to 10,000 cps.

In addition, the viscosity of the second polymer solution may be 150,000 to 250,000 cps, 150,000 to 220,000 cps, or 180,000 to 220,000 cps.

As the viscosity satisfies the above range, the polymer solution can be cast to a uniform thickness without defects, and a polyamide-based film having a substantially uniform thickness can be formed without local/partial variations in the optical/mechanical properties in the thickness and plane directions during drying.

The polymer solution may be cast to prepare a gel sheet (S200).

For example, the polymer solution may be extruded and/or cast onto a support such as a roll, a belt, or the like.

Referring to FIG. 5, the polymer solution may be cast onto a belt (30), transferred, and dried to form a gel sheet.

When the polymer solution is cast onto the belt (30), the injection rate of the polymer solution may be 300 to 700 g/minute. If the injection rate of the polymer solution satisfies the above range, the gel-sheet can be uniformly formed to an appropriate thickness.

The casting thickness of the polymer solution may be 200 μm to 700 μm. As the polymer solution is cast to a thickness within the above range, the final film produced after the drying and thermal treatment may have an appropriate and uniform thickness.

In some embodiments, the polymer solution may be cast onto a belt and dried at 50° C. to 200° C. In such a case, the evaporation amount of solvents can be effectively adjusted. Preferably, the casting and drying temperature may be 60° C. to 200° C., 70° C. to 200° C., 50° C. to 150° C., 60° C. to 150° C., 70° C. to 150° C., 50° C. to 120° C., 60° C. to 120° C., 70° C. to 120° C., 50° C. to 100° C., 60° C. to 100° C., or 70° C. to 100° C.

In some embodiments, the drying time may be 5 to 60 minutes, 10 to 60 minutes, 15 to 60 minutes, 5 to 50 minutes, 10 to 50 minutes, 15 to 50 minutes, 5 to 40 minutes, 10 to 40 minutes, or 15 to 40 minutes.

In some embodiments, the step of drying the polymer solution on the belt may be carried out by adjusting the evaporation amount of solvents per unit area to 1.1 to 3.0 $kg/m^2$. In such a case, the surface roughness characteristics of the film can be effectively adjusted to the desired ranges. Accordingly, a film with enhanced optical properties, mechanical properties, slip properties, and windability can be prepared. Preferably, the evaporation amount of solvents per unit area may be adjusted to 1.1 to 2.5 $kg/m^2$, 1.1 to 2.0 $kg/m^2$, 1.1 to 1.8 $kg/m^2$, 1.3 to 3.0 $kg/m^2$, 1.3 to 2.5 $kg/m^2$, 1.3 to 2.0 $kg/m^2$, 1.3 to 1.8 $kg/m^2$, 1.4 to 3.0 $kg/m^2$, 1.4 to 2.5 $kg/m^2$, 1.4 to 2.0 $kg/m^2$, or 1.4 to 1.8 $kg/m^2$.

For example, the moving distance of the belt may be 40 m to 60 m. In addition, the belt may be transferred at a speed of 0.5 m/minute to 15 m/minute, specifically, 1 m/minute to 10 m/minute.

The solvent of the polymer solution may be partially or totally volatilized during the drying to prepare the gel sheet.

According to an embodiment, the content of the residual solvent contained in the gel sheet upon drying may be 1,500 ppm or less. In such a case, the surface roughness characteristics of the film can be effectively adjusted to the desired ranges. Accordingly, a film with enhanced optical properties, mechanical properties, slip properties, and windability can be prepared.

According to an embodiment, the step of fixing the ends of the gel sheet may be carried out after the step of preparing the gel sheet.

In the step of fixing the ends of the gel sheet, the gel sheet may be stretched by 0.99 to 1.1 times in the MD direction. Specifically, the gel sheet may be stretched by 0.99 to 1.08 times, 1.0 to 1.08 times, or 1.01 to 1.08 times, in the MD direction, but it is not limited thereto.

In addition, in the step of fixing the ends of the gel sheet, the gel sheet may be stretched by 0.99 to 1.1 times in the TD direction. Specifically, the gel sheet may be stretched by 0.99 to 1.08 times, 1.0 to 1.08 times, or 1.01 to 1.08 times, in the TD direction, but it is not limited thereto.

In addition, the gel sheet may be gradually stretched in the following thermal treatment step. Specifically, the gel sheet may be gradually stretched by about 1.01 to about 1.08 times in the following thermal treatment step.

The dried gel sheet may be thermally treated to form a polyamide-based film (S300).

The thermal treatment of the gel sheet may be carried out, for example, through a thermosetting device (40).

The thermosetting device may thermally treat the gel sheet through hot air.

If the thermal treatment is carried out with hot air, the heat may be uniformly supplied. If the heat is not uniformly supplied, a satisfactory surface roughness cannot be achieved, which may raise or lower the surface energy too much.

According to an embodiment, the content of the residual solvent contained in the film upon thermal treatment may be 1,500 ppm or less. In such a case, the surface roughness characteristics of the film can be effectively adjusted to the desired ranges. Accordingly, a film with enhanced optical properties, mechanical properties, slip properties, and windability can be prepared.

The thermal treatment of the gel sheet may be carried out in a temperature range of 60° C. to 500° C. for 5 minutes to 200 minutes. Specifically, the thermal treatment of the gel sheet may be carried out in a temperature range of 80° C. to 300° C. at a temperature elevation rate of 1.5° C./minute to 20° C./minute for 10 minutes to 150 minutes.

In such an event, the initial temperature of the thermal treatment of the gel sheet may be 60° C. or higher. Specifically, the initial temperature of the thermal treatment of the gel sheet may be 80° C. to 180° C.

In addition, the maximum temperature in the thermal treatment may be 200° C. to 500° C. For example, the maximum temperature in the thermal treatment may be 230° C. to 500° C., 250° C. to 500° C., 300° C. to 500° C., 200° C. to 450° C., 230° C. to 450° C., or 300° C. to 450° C.

According to an embodiment, the thermal treatment of the gel sheet may be carried out in two or more steps.

Specifically, the thermal treatment may comprise a first hot air treatment step carried out for 5 minutes to 30 minutes in a range of 60° C. to 120° C.; and a second hot air treatment step carried out for 10 minutes to 120 minutes in a range of 120° C. to 350° C.

The thermal treatment under these conditions may adjust the solvent content and the degree of curing of the gel sheet to achieve the desired 3D surface roughness characteristics, and the cured film may secure high light transmittance, low haze, and an appropriate level of glossiness at the same time.

According to an embodiment, the thermal treatment may comprise passing it through an infrared ray (IR) heater. The thermal treatment by an IR heater may be carried out for 1 minute to 30 minutes in a temperature range of 300° C. or higher. Specifically, the thermal treatment by an IR heater may be carried out for 1 minute to 20 minutes in a temperature range of 300° C. to 500° C.

The cured film may be transferred and cooled.

Referring to FIG. 5, the cured film passing through the thermosetting device (40) may be cooled in a cooling chamber (not shown) or in an appropriate temperature atmosphere.

The step of cooling the cured film while it is transferred may comprise a first temperature lowering step of lowering the temperature at a rate of 100° C./minute to 1,000° C./minute and a second temperature lowering step of lowering the temperature at a rate of 40° C./minute to 400° C./minute.

In such an event, specifically, the second temperature lowering step is performed after the first temperature lowering step. The temperature lowering rate of the first temperature lowering step may be faster than the temperature lowering rate of the second temperature lowering step.

For example, the maximum rate of the first temperature lowering step may be faster than the maximum rate of the second temperature lowering step. Alternatively, the minimum rate of the first temperature lowering step may be faster than the minimum rate of the second temperature lowering step.

If the step of cooling the cured film is carried out in such a multistage manner, it is possible to have the physical properties of the cured film further stabilized and to maintain the optical properties, mechanical properties, slip properties, and the like of the film achieved during the curing step more stably for a long period of time.

Referring to FIG. 5, the cooled cured film may be wound through a winder (50).

The ratio of the moving speed of the gel-sheet on the belt at the time of drying to the moving speed of the cured film at the time of winding may be 1:0.95 to 1:1.40. Specifically, the ratio of the moving speeds may be 1:0.99 to 1:1.20, 1:0.99 to 1:1.10, or 1:1.0 to 1:1.05, but it is not limited thereto.

If the ratio of the moving speeds is outside the above range, the mechanical properties of the cured film may be impaired, and the flexibility and elastic properties may be deteriorated.

The polyamide-based film is prepared by the preparation process as described above such that it may have 3D surface roughness characteristics in predetermined ranges, so that its optical and mechanical properties, windability, and slip properties can be enhanced together.

The polyamide-based film can be applied to various uses that require flexibility, transparency, and a certain level of luminance. For example, the polyamide-based film can be applied to solar cells, displays, semiconductor devices, sensors, and the like.

In particular, since the polyamide-based film has excellent surface characteristics and optical properties, it can be advantageously applied to a cover window for a display device and to a display device. Since it has excellent folding characteristics, it can be advantageously applied to a foldable display device or a flexible display device.

Details on the polyamide-based film prepared by the process for preparing a polyamide-based film are as described above.

EMBODIMENTS FOR CARRYING OUT THE INVENTION

Hereinafter, the above description will be described in detail by referring to examples. However, these examples are set forth to illustrate the present invention, and the scope of the present invention is not limited thereto.

Test Example 1

A 1-liter glass reactor equipped with a temperature-controllable double jacket was charged with dimethylacetamide (DMAc) as an organic solvent at 10° C. under a nitrogen atmosphere. Then, 2,2'-bis(trifluoromethyl)-4,4'-diaminobiphenyl (TFMB) as an aromatic diamine was slowly added thereto and dissolved.

Subsequently, the temperature inside the reactor was raised to 30° C., and 4,4'-(hexafluoroisopropylidene)diphthalic anhydride (6FDA) was slowly added while the reaction solution was stirred for 2 hours.

The temperature of the reactor was lowered to 10° C., and terephthaloyl chloride (TPC) was slowly added while the mixture was stirred for 1 hour. Then, isophthaloyl chloride (IPC) (94% by mole of the total amount introduced) was added, followed by stirring the mixture for 1 hour, thereby preparing a first polymer solution. The viscosity of the first polymer solution thus prepared was about 1,000 to 10,000 cps.

Then, 1 ml of an IPC solution having a concentration of 10% by weight in a DMAc solvent was added thereto, followed by stirring the mixture for 30 minutes. This procedure was repeated, whereby a second polymer solution having a viscosity of 180,000 to 220,000 cps was prepared.

Here, the viscosity of the polymer solution was measured using RM100 CP2000 PLUS equipment of LAMY Rheology Instruments under a constant temperature condition of 20° C. and a shear rate of 4 $s^{-1}$ to check whether the target viscosity was reached.

A polymer solution was prepared by adding silica (DMAc-ST-ZL, Nissan) having a particle diameter of about 70 nm to 100 nm dispersed in a DMAc solvent to the second polymer solution in an amount of 1,500 ppm based on the total solids content of the polymer solution. The silica had an average particle diameter (D50) of about 83 nm according to the BET method.

The polymer solution was cast onto a belt and transferred while the injection speed onto the belt, drying temperature, drying time, transferring distance, and transferring speed such that about 1.8 kg/$m^2$ of DMAc per unit area was evaporated before it was put into a thermosetting device. Here, the drying was carried out in a way that hot air was supplied to the gel sheet.

The dried polyamide-based gel sheet was put into a thermosetting device in which the temperature was raised at a temperature elevation rate of 2° C./minute in the temperature range of 80° C. to 300° C., and it was cooled and wound to obtain a polyamide-based film having a thickness of 50 μm.

The specific composition and molar ratio of the polyamide-based polymer are shown in Table 1 below.

Test Examples 2 to 11

Polyamide-based films were each obtained in the same manner as in Test Example 1, except that the monomer composition of the polyamide-based polymer, filler content, and evaporation amount per unit area in the drying step were changed as shown in Table 1 below.

Evaluation Example

The films prepared in the Test Examples were each measured and evaluated for the following properties. The results are shown in Table 1 below.

Evaluation Example 1: Measurement of 3D Surface Roughness

CONTOUR GT-X of Bruker was used for measurement. The measurement area at one time was set to 166 μm×220 μm, a 20-magnification objective lens was adopted for measurement, and a Gaussian filter was then applied for basic calibration. The same measurement was repeated 5 times, and an average value was obtained from the measured data, exclusive of the maximum and minimum values. The average difference value (surface elevation difference (Sz)) of the 5 highest peaks and 5 lowest valleys of the surface in the measured area, the number of peaks per unit area appearing at a point higher than the mean plane by 5% or more of the surface elevation difference (Sz) and spaced apart from other peaks at a certain distance (1% of the sample side size) (number of summits per unit area (Sds)), and the mean curvature of the summits (Ssc) are shown in Table 1 below.

Evaluation Example 2: Measurement of Modulus

A sample was cut out by at least 10 cm in the direction perpendicular to the main shrinkage direction of the film and by 10 mm in the main shrinkage direction. It was fixed by the clips disposed at an interval of 10 cm in a universal testing machine UTM 5566A of Instron. A stress-strain curve was obtained until the sample was fractured while it was stretched at a speed of 12.5 mm/minute at room temperature. The slope of the load with respect to the initial strain on the stress-strain curve was taken as the modulus (GPa).

Evaluation Example 3: Measurement of Transmittance and Haze

The light transmittance and haze were measured using a haze meter NDH-5000W manufactured by Nippon Denshoku Kogyo in accordance with the JIS K 7136 standard.

Evaluation Example 4: Measurement of Yellow Index

The yellow index (YI) was measured with a spectrophotometer (UltraScan PRO, Hunter Associates Laboratory) under the conditions of d65 and 10° in accordance with the ASTM-E313 standard.

Evaluation Example 5: Measurement of Pencil Hardness

The pencil hardness was measured using a pencil hardness tester of Kipae ENT and Pressure-Proofed Hi-Density Lead Pencil of Mitsubishi Japan.

Specifically, after the polyamide-based film was prepared, the surface hardness of the side opposite to the belt contact side was measured. It was fixed to the glass substrate of a pencil hardness tester such that the opposite side was exposed, Mitsubishi pencil was installed at an angle of 45 degrees to the surface of the film, the surface of the film was scratched 5 times under a load of 750 g, and the presence or absence of scratches was observed to determine the hardness.

Evaluation Example 6: Evaluation of Slip Properties

When the film was wound into a roll, the coefficient of friction between one side and the other side of the film that came into contact with each other was measured and evaluated. It was evaluated as good if 0.3 or less, and it was evaluated as poor if greater than 0.3.

Evaluation Example 7: Evaluation of Windability

Both ends of the film were trimmed to have a width of 1,460 mm, and the film in a length of 500 m was continuously wound to prepare a roll. It was determined by visually observing whether there was a lump showing a difference in light and shade across the entire width. If 2 or more workers out of 10 workers determined that there was a lump, it was evaluated as poor; otherwise, it was evaluated as good.

TABLE 1

| | | Test Ex. 1 | Test Ex. 2 | Test Ex. 3 | Test Ex. 4 | Test Ex. 5 | Test Ex. 6 | Test Ex. 7 | Test Ex. 8 | Test Ex. 9 | Test Ex. 10 | Test Ex. 11 |
|---|---|---|---|---|---|---|---|---|---|---|---|---|
| Polymerization ratio of the polyamide-based polymer | Diamine compound (molar ratio) | TFMB 100 | TFMB 100 | TFMB 100 | TFMB 100 | TFMB 100 | TFMB 100 | TFMB 100 | TFMB 100 | TFMB 100 | TFMB 100 | TFMB 100 |
| | Dianhydride compound (molar ratio) | 6FDA 5 | 6FDA 5 | 6FDA 5 | — | — | 6FDA 10 BPDA 36 | 6FDA 10 BPDA 36 | 6FDA 5 | 6FDA 5 | 6FDA 5 | 6FDA 5 |
| | Dicarbonyl compound (molar ratio) | TPC 70 IPC 25 | TPC 70 IPC 25 | TPC 70 IPC 25 | TPC 60 IPC 40 | TPC 50 IPC 50 | TPC 54 | TPC 54 | TPC 70 IPC 25 | TPC 70 IPC 25 | TPC 70 IPC 25 | TPC 70 IPC 25 |
| Filler | type | Silica (Nissan) | Silica (Nissan) | Silica (Nissan) | Silica (Nissan) | Silica (Nissan) | Silica (Nissan) | Silica (Nissan) | Silica (Nissan) | Silica (Nissan) | Silica (Nissan) | Silica (Nissan) |
| | Particle diameter (D50; nm) | 83 | 83 | 83 | 83 | 83 | 83 | 83 | 83 | 83 | 83 | 83 |
| | Particle diameter distribution (nm) | 70 to 100 | 70 to 100 | 70 to 100 | 70 to 100 | 70 to 100 | 70 to 100 | 70 to 100 | 70 to 100 | 70 to 100 | 70 to 100 | 70 to 100 |
| | Content (ppm) | 1,500 | 1,500 | 1,200 | 1,500 | 1,500 | 1,500 | 1,200 | 500 | 1,500 | 3,500 | 1,500 |

TABLE 1-continued

| | | Test Ex. 1 | Test Ex. 2 | Test Ex. 3 | Test Ex. 4 | Test Ex. 5 | Test Ex. 6 | Test Ex. 7 | Test Ex. 8 | Test Ex. 9 | Test Ex. 10 | Test Ex. 11 |
|---|---|---|---|---|---|---|---|---|---|---|---|---|
| Evaporation amount per unit area ($kg/m^2$) | | 1.8 | 1.4 | 1.4 | 1.4 | 1.4 | 1.8 | 1.4 | 1.4 | 1.0 | 1.4 | 3.1 |
| 3D surface roughness | Sds ($/mm^2$) | 2,436 | 2,924 | 3,030 | 2,920 | 2,910 | 2,810 | 2,200 | 4,454 | 1,311 | 1,525 | 3,942 |
| | Ssc (/mm) | 27 | 38 | 42 | 25 | 26 | 28 | 26 | 34 | 23 | 56 | 48 |
| | Sz (nm) | 535 | 350 | 337 | 348 | 350 | 493 | 372 | 313 | 345 | 371 | 401 |
| Modulus (GPa) | | 6.7 | 6.7 | 6.8 | 6.6 | 6.6 | 6.4 | 6.5 | 6.3 | 6.5 | 6.8 | 6.6 |
| Transmittance (%) | | 89.1 | 89.2 | 89.4 | 89.5 | 89.4 | 89.3 | 89.3 | 89.9 | 89.2 | 89.3 | 89.1 |
| Haze (%) | | 0.5 | 0.5 | 0.4 | 0.4 | 0.5 | 0.6 | 0.4 | 0.2 | 0.4 | 1.3 | 0.4 |
| Yellow index | | 2.8 | 2.7 | 2.7 | 1.7 | 1.7 | 2.4 | 2.2 | 2.6 | 2.4 | 3.2 | 3.9 |
| Pencil hardness | | H | H | H | H | H | H | H | H | HB | H | H |
| Slip properties | | Good | Good | Good | Good | Good | Good | Good | Poor | Poor | Good | Good |
| Windability | | Good | Good | Good | Good | Good | Good | Good | Poor | Good | Good | Good |

Referring to Table 1, in Test Example 8 in which the Sds value exceeded 4,400/$mm^2$, both slip properties and windability were poor. On the other hand, in the Test Examples in which the Sds value was 4,400/$mm^2$ or less, the mechanical and optical properties as well as slip properties and windability were overall excellent.

| Explanation of Reference Numerals | |
|---|---|
| 10: polymerization apparatus | 20: tank |
| 30: belt | 40: thermosetting device |
| 50: winder | |
| 100: polyamide-based film | |
| 101: first side | 102: second side |
| 200: functional layer | 300: cover window |
| 400: display unit | 500: adhesive layer |

The invention claimed is:

1. A polyamide-based film, which comprises a polyamide-based polymer and a filler in an amount of 600 ppm or more relative to the weight of the polyamide-based polymer, wherein when the 3D surface roughness thereof is measured, the number of summits per unit area (Sds) measured by the following measurement method is 4,400/$mm^2$ or less:

[Measurement method]

CONTOUR GT-X of Bruker is used, the measurement area at one time is set to 166 μm×220 μm, a 20-magnification objective lens is adopted for measurement, and a Gaussian filter is applied after the measurement, wherein the number of summits per unit area (Sds) is 1,600 to 3,900/$mm^2$.

2. The polyamide-based film of claim 1, wherein the surface elevation difference (Sz) is 320 nm to 2,000 nm, wherein Sz is the average difference value between the five highest peaks and five lowest valleys.

3. The polyamide-based film of claim 1, wherein the summits have an average curvature (Ssc) of 24 to 47/mm.

4. The polyamide-based film of claim 1, wherein the filler comprises inorganic particles, and the filler has an average particle diameter (D50) of 30 nm to 200 nm.

5. The polyamide-based film of claim 1, wherein the content of the filler is 600 ppm to 3,000 ppm based on the total weight of the polyamide-based polymer.

6. The polyamide-based film of claim 1, wherein the polyamide-based polymer comprises an imide-based repeat unit and an amide-based repeat unit at a molar ratio of 0:100 to 50:50.

7. The polyamide-based film of claim 1, which, based on a thickness of the film of 50 μm, has a modulus of 5 GPa or more, a transmittance of 80% or more, a haze of 1% or less, a yellow index of 3 or less, and a pencil hardness of F or higher.

8. A process for preparing the polyamide-based film of claim 1, which comprises:

polymerizing a diamine compound, a dicarbonyl compound, and, optionally, a dianhydride compound in an organic solvent to prepare a polymer solution comprising a polyamide-based polymer;

casting the polymer solution onto a belt and drying it to prepare a gel sheet; and thermally treating the gel sheet.

9. The process for preparing the polyamide-based film according to claim 8, wherein the step of preparing the polymer solution comprising a polyamide-based polymer comprises producing a first polymer solution having a viscosity of 500 cps to 10,000 cps when measured at 20° C.; and further reacting the first polymer solution with an additional dicarbonyl compound to produce a second polymer solution having a viscosity of 150,000 cps to 300,000 cps when measured at 20° C.

10. The process for preparing the polyamide-based film according to claim 8, wherein the step of drying the polymer solution on the belt is carried out by adjusting the evaporation amount of solvents per unit area to 1.1 to 3.0 $kg/m^2$.

11. A cover window, which comprises the polyamide-based film of claim 1 and a functional layer.

12. A display device, which comprises a display unit; and a cover window disposed on the display unit, wherein the cover window comprises the polyamide-based film of claim 1 and a functional layer.

* * * * *